(12) United States Patent
Zambrano et al.

(10) Patent No.: US 8,803,800 B2
(45) Date of Patent: Aug. 12, 2014

(54) USER INTERFACE CONTROL BASED ON HEAD ORIENTATION

(75) Inventors: Dayam Joel Zambrano, Bothell, WA (US); Christian Piccolo, Treviso (IT); Jeffrey W. Hartin, Carnation, WA (US); Shawn M. Lucas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 157 days.

(21) Appl. No.: 13/309,574

(22) Filed: Dec. 2, 2011

(65) Prior Publication Data

US 2013/0141324 A1    Jun. 6, 2013

(51) Int. Cl.
*G09G 5/00* (2006.01)

(52) U.S. Cl.
USPC .......................................................... 345/156

(58) Field of Classification Search
CPC .......... G06F 3/011; G06F 3/012; G06F 3/013
USPC ......... 345/156, 158, 419, 427, 428, 619, 647, 345/661; 382/103, 118, 154; 463/36
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |

(Continued)

FOREIGN PATENT DOCUMENTS

| | | |
|---|---|---|
| CN | 201254344 Y | 6/2010 |
| EP | 0583061 A2 | 2/1994 |

(Continued)

OTHER PUBLICATIONS

Estimating gaze from a single view of a face, Andrew Gee and Roberto Cipolla, 1994.*

(Continued)

*Primary Examiner* — Sumati Lefkowitz
*Assistant Examiner* — Peijie Shen
(74) *Attorney, Agent, or Firm* — Aaron Chatterjee; Andrew Sanders; Micky Minhas (57) ABSTRACT

Embodiments distinguish among user interface elements based on head orientation. Coordinates representing a set of at least three reference points in an image of a subject gazing on the user interface elements are received by a computing device. The set includes a first reference point and a second reference point located on opposite sides of a third reference point. A first distance between the first reference point and the third reference point is determined. A second distance between the second reference point and the third reference point is determined. The computing device compares the first distance to the second distance to calculate a head orientation value. The computing device selects at least one of the user interface elements based on the head orientation value. In some embodiments, the head orientation value enables the user to navigate a user interface menu or control a character in a game.

20 Claims, 7 Drawing Sheets

(56) References Cited

U.S. PATENT DOCUMENTS

| | | | |
|---|---|---|---|
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,061,064 A * | 5/2000 | Reichlen ............... 345/418 |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |

(56) References Cited

U.S. PATENT DOCUMENTS

| | | | |
|---|---|---|---|
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,904,477 B2 | 3/2011 | Jung et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2003/0018475 A1* | 1/2003 | Basu et al. | 704/270 |
| 2004/0017472 A1 | 1/2004 | Gorodnichy | |
| 2008/0026838 A1 | 1/2008 | Dunstan et al. | |
| 2008/0285799 A1* | 11/2008 | Chiu et al. | 382/103 |
| 2008/0298637 A1* | 12/2008 | Hu et al. | 382/103 |
| 2009/0217211 A1 | 8/2009 | Hildreth et al. | |
| 2010/0306716 A1 | 12/2010 | Perez | |
| 2011/0294579 A1* | 12/2011 | Marks et al. | 463/36 |
| 2012/0105486 A1* | 5/2012 | Lankford et al. | 345/661 |
| 2012/0295708 A1* | 11/2012 | Hernandez-Abrego et al. | 463/36 |

FOREIGN PATENT DOCUMENTS

| | | | |
|---|---|---|---|
| JP | 8044490 A1 | 2/1996 | |
| JP | 2008033626 A | 2/2008 | |
| JP | 2009053916 A | 3/2009 | |
| KR | 1020070020916 A | 2/2007 | |
| WO | 9310708 A1 | 6/1993 | |
| WO | 9717598 A1 | 5/1997 | |
| WO | 9944698 A1 | 9/1999 | |
| WO | 03030086 A1 | 4/2003 | |

OTHER PUBLICATIONS

Manresa-Yee, et al., "Towards hands-free interfaces based on real-time robust facial gesture recognition", Retrieved at <<http://citeseerx.ist.psu.edu/viewdoc/download?doi=10.1.1.106.5177&rep=rep1&type=pdf>>, Articulated Motion and Deformable Objects, AMDO'2006, Jul. 2006, pp. 504-513.

Gorodnichy, et al., "Nouse use your nose as a mouse' perceptual vision technology for hands-free games and interfaces", Retrieved at <<http://people.scs.carleton.ca/~roth/iit-publications-iti/docs/NRC-47140.pdf>>, Image and Vision Computing, Mar. 22, 2004, pp. 931-942.

Gorodnichy, et al., "Working with a computer hands-free using Nouse Perceptual Vision Interface", Retrieved at <<http://citeseerx.ist.psu.edu/viewdoc/download?doi=10.1.1.186.4900&rep=rep1&type=pdf>>, International Workshop on Video Processing and Recognition (VideoRec'07), May 2007, pp. 12.

Varona, et al., "Hands-free vision-based interface for computer accessibility", Retrieved at <<http://dmi.uib.es/~cmanresay/Research/%5BVar08%5DJNCA08.pdf>>, Journal of Network and Computer Applications, Mar. 13, 2008, pp. 357-374.

Unknown, "ITU Gaze Tracker", Retrieved at <<http://www.gazegroup.org/downloads/23-gazetracker>>, Gaze Group, IT University of Copenhagen, Retrieval date: Nov. 14, 2011, pp. 3.

Yang, et al., "Model-based Head Pose Tracking With Stereovision", Technical Report MSR-TR-2001-102, Microsoft Corporation, Oct. 2001, pp. 12.

Gee, et al. "Non-Intrusive Gaze Tracking for Human-Computer Interaction", Proc. Mechatronics and Machine Vision in Practice, Australia, 1994, pp. 112-117.

"International Search Report", Mailed Date: Feb. 7, 2013, Application No. PCT/US2012/066127, Filed Date: Nov. 20, 2012, pp. 8.

Kanade, et al., "A Stereo Machine for Video-rate Dense Depth Mapping and Its New Applications", Retrieved at <<citeseerx.ist.psu.edu/viewdoc/download?doi=10.1.1.33...rep . . . >>, IEEE Computer Society Conference on Computer Vision and Pattern Recognition, The Robotics Institute, Carnegie Mellon University, Pittsburgh, PA, 1996, pp. 196-202.

Miyagawa, et al., "CCD-Based Range Finding Sensor", Retrieved at <<www.cs.cmu.edu/afs/cs/usr/brajovic/www/pubweb/pdfs/miya.pdf>>, IEEE Transactions on Electron Devices, vol. 44, No. 10, Oct. 1997, pp. 1648-1652.

Rosenhahn et al., "Automatic Human Model Generation", Retrieved at <<https://domino.mpi-inf.mpg.de/intranet/ag4/ag4publ.../CAIP05.pdf>>, In Computer Analysis of Images and Patterns (CAIP) 2005, pp. 41-48.

Aggarwal, et al., "Human Motion Analysis: A Review", Retrieved at <<cvrc.ece.utexas.edu/.../Q.%20Cai, . . . >>, IEEE Nonrigid and Articulated Motion Workshop, University of Texas at Austin, Austin, TX, 1997, pp. 90-102.

Shao, et al., "An Open System Architecture for a Multimedia and Multimodal User Interface", Retrieved at <<http://www.dinf.ne.jp/doc/english/Us_Eu/conf/tide98/84/shao_schroter.html>>, Japanese Society for Rehabilitation of Persons with Disabilities (JSRPD), Japan, Aug. 24, 1998, pp. 8.

Kohler, Markus., "Special Topics of Gesture Recognition Applied in Intelligent Home Environments", Retrieved at <<reference.kfupm.edu.sa/.../special_topics_of_gesture_recognition_ap . . . >>, In Proceedings of the Gesture Workshop, Germany, 1998, pp. 285-296.

Kohler, Markus., "Vision Based Remote Control in Intelligent Home Environments", Retrieved at <<citeseerx.ist.psu.edu/viewdoc/download?doi=10.1.1.34...rep . . . >>, University of Erlangen-Nuremberg/Germany, 1996, pp. 147-154.

Kohler, Markus., "Technical Details and Ergonomical Aspects of Gesture Recognition applied in Intelligent Home Environments", Retrieved at <<citeseerx.ist.psu.edu/viewdoc/download?doi=10.1.1.40...rep>>, 1997, pp. 35.

Hasegawa, et al., "Human-Scale Haptic Interaction with a Reactive Virtual Human in a Real-Time Physics Simulator", Retrieved at <<haselab.net/files/paperDB_uploads/pdf-tnmt2snz.pdf>>, ACM Computers in Entertainment, vol. 4, No. 3, Article 6C, Jul. 2006, pp. 12.

Qian et al., "A Gesture-Driven Multimodal Interactive Dance System", Retrieved at <<kusu.comp.nus.edu/proceedings/icme04/html/papers/P89469.pdf>>, IEEE International Conference on Multimedia and Expo (ICME), Jun. 2004, pp. 1579-1582.

Zhao, Liang., "Dressed Human Modeling, Detection, and Parts Localization", Retrieved at <<www.ri.cmu.edu/pub_files/pub4/zhao.../zhao_liang_2001_1.pdf>>, The Robotics Institute, Carnegie Mellon University, Pittsburgh, PA, CMU-RI-TR-01-19, Jul. 26, 2001, pp. 121.

He, Lei., "Generation of Human Body Models", Retrieved at <<www.mpi-inf.mpg.de/~rosenhahn/publications/LeiThesis.pdf>>, University of Auckland, New Zealand, Apr. 2005, pp. 111.

Isard, et al., "Condensation—Conditional Density Propagation for Visual Tracking", Retrieved at <<www.mpi-inf.mpg.de/~rosenhahn/publications/LeiThesis.pdf>>, International Journal of Computer Vision 29(1), 1998, pp. 5-28.

Livingston, Mark Alan., "Vision-based Tracking with Dynamic Structured Light for Video See-through Augmented Reality", Retrieved at <<www.cs.unc.edu/Research/us/livingst/thesis.pdf>>, University of North Carolina at Chapel Hill, 1998, pp. 145.

Wren, et al., "Pfinder: Real-Time Tracking of the Human Body", Retrieved at <<www.cvmt.dk/education/teaching/e06/CVG9/CV/.../pfinder.pdf>>, MIT Media Laboratory Perceptual Computing Section Technical Report No. 353, IEEE Transactions on Pattern Analysis and Machine Intelligence, vol. 19, No. 7, Jul. 1997, pp. 780-785.

Breen, et al., "Interactive Occlusion and Collusion of Real and Virtual Objects in Augmented Reality", Retrieved at <<citeseerx.ist.psu.edu/viewdoc/download?doi=10.1.1.38.113 . . . >> Technical Report ECRC-95-02, European Computer-Industry Research Center GmbH, 1995, pp. 22.

Freeman, et al., "Television Control by Hand Gestures", Retrieved at <<www.merl.com/papers/docs/TR94-24.pdf>>, Mitsubishi Electric Research Laboratories, TR94-24, Dec. 1994, pp. 7.

Hongo, et al., "Focus of Attention for Face and Hand Gesture Recognition Using Multiple Cameras", Retrieved at <<http://ieeexplore.ieee.org/xpl/login.jsp?tp=&arnumber=840627&url=http%3A%2F%2Fieeexplore.ieee.org%Fiel5%2F6770%2F18088%2F00840627.

(56) References Cited

OTHER PUBLICATIONS pdf%3Farnumber%3D840627>>, 4th IEEE International Conference on Automatic Face and Gesture Recognition, Mar. 2000, pp. 156-161.

Pavlovic, et al., "Visual Interpretation of Hand Gestures for Human-Computer Interaction: A Review", Retrieved at <<www.cs.rutgers.edu/~vladimir/pub/pavlovic97pami.pdf>>, IEEE Transactions on Pattern Analysis and Machine Intelligence, vol. 19, No. 7, Jul. 1997, pp. 677-695.

Azarbayejani, et al., "Visually Controlled Graphics", Retrieved at <<reference.kfupm.edu.sa/.../visually_controlled_graphics_69333.pdf>>, IEEE Transactions on Pattern Analysis and Machine Intelligence, vol. 15, No. 6, Jun. 1993, pp. 602-605.

Granieri, et al., "Simulating Humans in VR", Retrieved at <<reference.kfupm.edu.sa/.../simulating_humans_in_vr_2004398. pdf>>, The British Computer Society, Academic Press, Oct. 12, 1994, pp. 15.

Brogan, et al., "Dynamically Simulated Characters in Virtual Environments", Retrieved at <<citeseerx.ist.psu.edu/viewdoc/download-?doi=10.1.1.10...rep . . . >>, IEEE Computer Graphics and Applications, vol. 8, No. 5, Sep./Oct. 1998, pp. 58-69.

Fisher, et al., "Virtual Environment Display System", Retrieved at <<itofisher.com/sfisher/portfolio/.../Virtual_Environment_Display.pdf>>, ACM Workshop on Interactive 3D Graphics, Oct. 23-24, 1986, pp. 12.

"Virtual High Anxiety", Tech Update, Aug. 1995, pp. 1.

Sheridan, et al., "Virtual Reality Check", Technology Review, vol. 96, No. 7, Oct. 1993, pp. 22-28.

Stevens, Jane E., "Flights into Virtual Reality Treating Real-World Disorders", Science Psychology, The Washington Post, Mar. 27, 1995, pp. 2.

"Simulation and Training", Division Incorporated, 1994, pp. 6.

\* cited by examiner

USER INTERFACE CONTROL BASED ON HEAD ORIENTATION

BACKGROUND

Some existing systems provide users with accessibility or ease of access to a computer using various input methods. For example, some of the existing systems include a camera and face tracking algorithms. The algorithms identify facial features such as the eyes, nose, and mouth of a user. The eyes, for example, may be identified by flashing infrared light at the user to locate the retina. The tip of the nose may be identified by calculating the curvature of the nose. The orientation of a head may be determined by computing a mathematical normal of the face, or by using two cameras to generate a three-dimensional model of the face.

Such existing systems, however, either require expensive and dedicated hardware or require intensive computation not practical for real-time or near real-time use.

SUMMARY

Embodiments of the disclosure distinguish among a plurality of user interface elements based on head orientation. A computing device receives coordinates representing a set of at least three reference points of a subject gazing on a plurality of user interface elements. The set includes at least a first reference point and a second reference point located on opposite sides of a third reference point. The computing device determines a first distance between the first reference point and the third reference point and a second distance between the second reference point and the third reference point. The determined first distance is compared to the determined second distance to calculate a head orientation value for the subject. At least one of the plurality of user interface elements is selected based on the calculated head orientation value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable a user 102 to control or navigate a user interface 104 without hand movements using a set 212 of reference points derived from an image of the user 102. In some embodiments, reference points on the face of the user 102 are compared to identify a head orientation value of the user 102. The head orientation value is mapped or aligned to the user interface 104 to identify at least one user interface element 214 displayed thereon. Aspects of the disclosure operate in real-time or near real-time (e.g., 25 frames per second) and integrate with other systems (e.g., face tracking algorithms) to enhance the user experience.

While some aspects of the disclosure are described and illustrated herein with respect to a gaming environment, other embodiments are operable in operating environments such as on laptop computers, in video conferencing scenarios, for remote surveillance operations, and the like.

Figure 1:
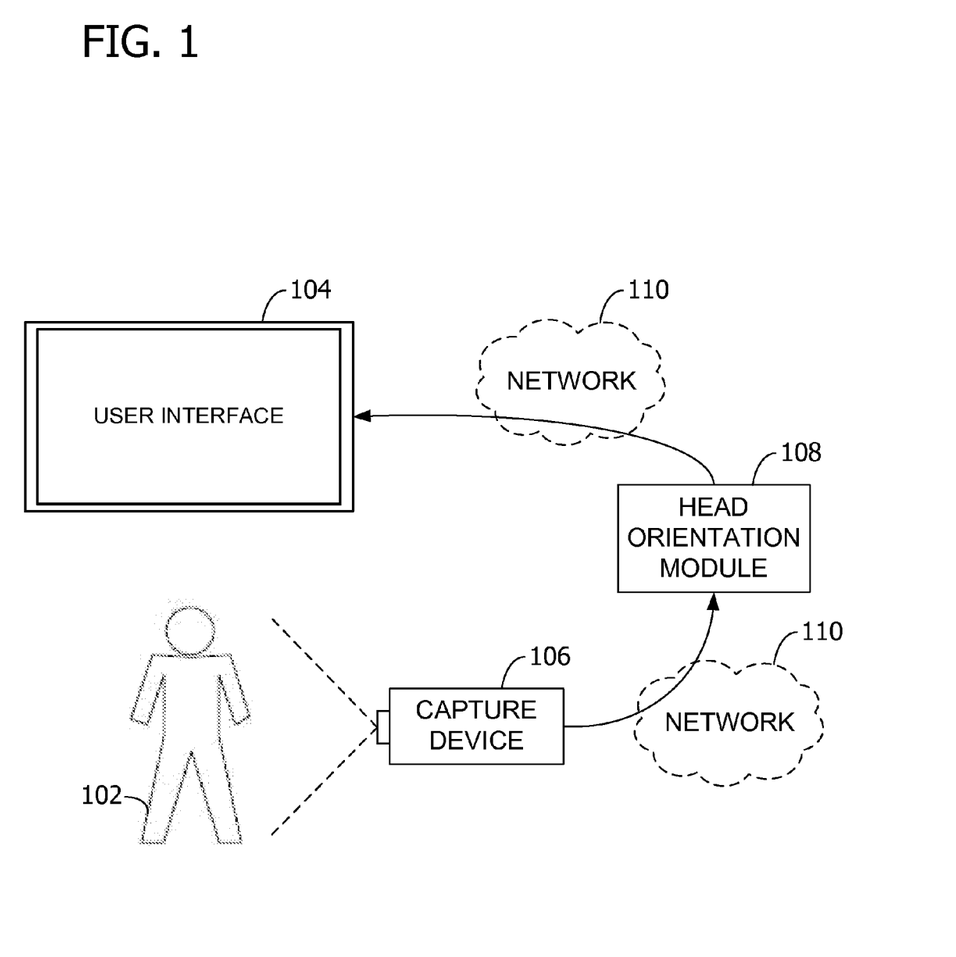
FIG. 1 is an exemplary block diagram illustrating a head orientation module interfacing with a capture device and a user interface.

Referring next to FIG. 1, an exemplary block diagram illustrates a head orientation module 108 interfacing with a capture device 106 and the user interface 104. In the example of FIG. 1, the user 102 is viewing the user interface 104. The capture device 106 includes any means for capturing images of the user 102. The capture device 106 may include one or more components such as a motion sensor, camera, low-light or night-vision lens, light beam projector and/or detector, radio frequency (RF) beam projector and/or detector, and the like. Collectively, the images represent motion of the user 102. An exemplary capture device 106 includes a camera that may have a computing system associated therewith for processing the images captured by the camera. The computing system may be internal to, or separate from, the capture device 106. The images are processed to perform one or more controls or actions within one or more applications (e.g., applications 210) associated with the user interface 104. In some embodiments, the capture device 106 is a camera associated with a gaming console. In other embodiments, the capture device 106 is a webcam associated with a computing device 202 of the user 102 such as a laptop.

The head orientation module 108 receives one or more of the images captured by the capture device 106. The images are sent, or made accessible to, the head orientation module 108 in real-time or near real-time (e.g., as the images are captured and/or processed) to enable responsive control of the user interface 104 by the user 102 based on the captured images. The head orientation module 108 represents any logic (e.g., implemented as software executed by the computing device 202, as hardware, or both) for processing the captured images. The head orientation module 108 and the capture device 106 may be housed in the same hardware chassis and communicate via a bus or other internal communication means. The head orientation module 108 and the capture device 106 may also be implemented on the same semiconductor chip. In other embodiments, the head orientation module 108 is local to the capture device 106, yet not within the same chassis or on the same chip. In such embodiments, the capture device 106 and the head orientation module 108 exchange data via any communication protocol or bus (e.g., a universal serial bus). In yet additional embodiments, the head orientation module 108 is implemented as a cloud service communicating with the capture device 106 and the user interface 104 via a network 110 such as the Internet.

The head orientation module 108 operates as described herein to process the images from the capture device 106 to control the user interface 104. In some embodiments, the head orientation module 108 produces a head orientation value that can be mapped to a portion of the user interface 104. In other embodiments, the head orientation module 108 further maps or applies the head orientation value to the user interface 104 to determine a control or action to perform. The head orientation module 108 may perform the determined control or action, or identify the determined control or action to another module (e.g., the capture device 106 or computing system).

In some embodiments, the user interface 104 includes a graphics card for displaying data to the user 102. The user interface 104 may also include computer-executable instructions (e.g., a driver) for operating the graphics card. Further, the user interface 104 represents a display (e.g., a television, laptop display, or touch screen display) and/or computer-executable instructions (e.g., a driver) for operating the display.

In a webcam embodiment, the capture device 106, head orientation module 108, and user interface 104 are part of a mobile computing device, laptop, or other user computing device. For example, the head orientation module 108 is implemented as software executing on the user computing device. In such embodiments, the user computing device may further include one or more of the following to provide data to the user 102 or receive data from the user 102: speakers, a sound card, a microphone, a vibration motor, one or more accelerometers, a BLUETOOTH brand communication module, global positioning system (GPS) hardware, and a photoreceptive light sensor.

Figure 2:
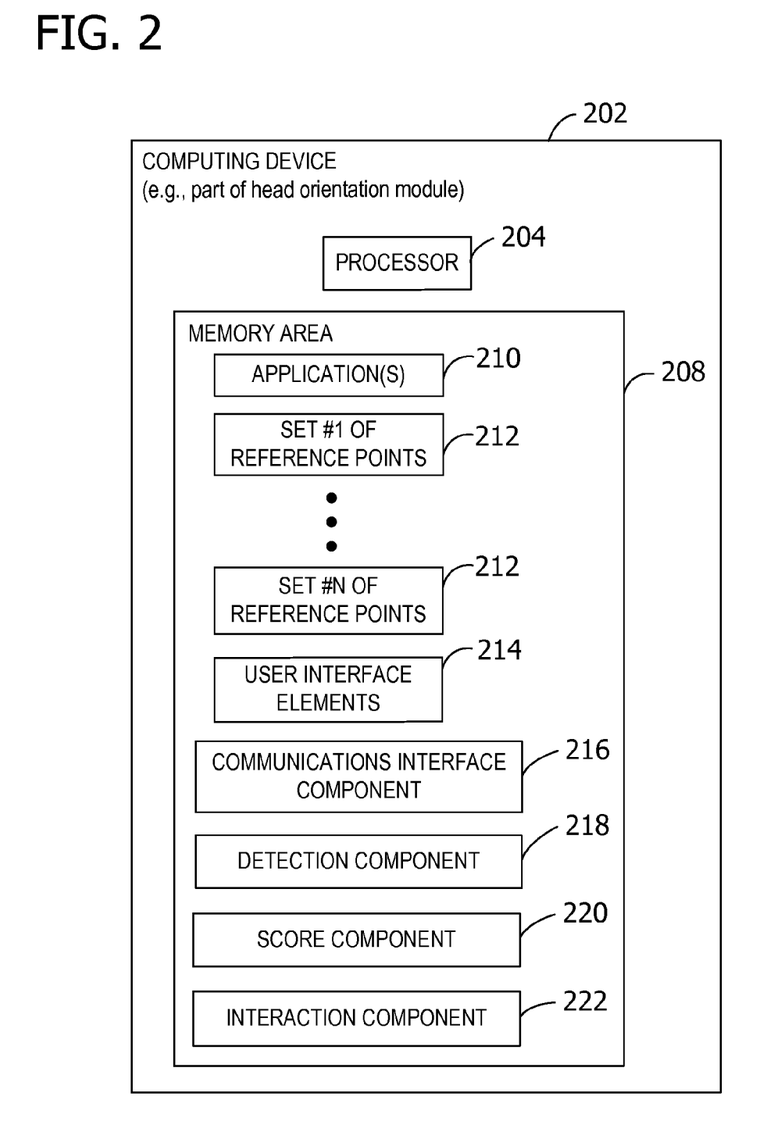
FIG. 2 is an exemplary block diagram illustrating a computing device for implementing the head orientation module.

Referring next to FIG. 2, an exemplary block diagram illustrates the computing device 202 for implementing the head orientation module 108. In some embodiments, the computing device 202 represents a system for distinguishing among a plurality of user interface elements 214 based on head orientation. The computing device 202 represents any device executing instructions (e.g., as application programs, operating system functionality, or both) to implement the operations and functionality associated with the computing device 202. The computing device 202 may include a gaming console or other multimedia device. In some embodiments, the computing device 202 includes a mobile telephone, laptop, tablet, computing pad, netbook, portable media player, desktop personal computer, kiosk, and/or tabletop device. Additionally, the computing device 202 may represent a group of processing units or other computing devices.

The computing device 202 has at least one processor 204 and a memory area 208. The computing device 202 may also include the user interface 104 in some embodiments. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202. In some embodiments, the processor 204 is programmed to execute instructions such as those illustrated in the figures (e.g., FIG. 3 and FIG. 4).

The computing device 202 further has one or more computer readable media such as the memory area 208. The memory area 208 includes any quantity of media associated with or accessible by the computing device 202. The memory area 208 may be internal to the computing device 202 (as shown in FIG. 2), external to the computing device 202 (not shown), or both (not shown).

The memory area 208 stores, among other data, one or more applications 210. The applications 210, when executed by the processor 204, operate to perform functionality on the computing device 202. Exemplary applications 210 include gaming applications and non-gaming applications. Non-gaming applications include, for example, mail application programs, web browsers, calendar application programs, address book application programs, messaging programs, media applications, location-based services, search programs, and the like. The applications 210 may communicate with counterpart applications or services such as web services accessible via the network 110. For example, the applications 210 may represent downloaded client-side applications that correspond to server-side services executing in a cloud.

The memory area 208 further stores one or more sets 212 of reference points such as set #1 of reference points to set #N of reference points. Each set 212 may include one or more of the reference points. In some embodiments, each of the reference points includes coordinates of a point on an image captured by the capture device 106. Exemplary coordinates are one-, two-, or three-dimensional coordinates. In some embodiments, the images include objects and the reference points include a first reference point and a second reference point located on opposite sides of a third reference point on the object. In examples in which the objects include faces, the sets 212 of reference points represent sets of facial reference points 401 each including at least two eyes (e.g., center of the eye or either corner of the eye) and a nose. In other examples, the facial reference points 401 correspond to other facial features such as the mouth or corners thereof, ears, eyebrows, chin, etc. In some embodiments, each set of facial reference points 401 is derived from a single frame of video captured by the capture device 106.

The memory area 208 further stores one or more user interface elements 214. The user interface elements 214 include any media element for consumption by the user 102 including, for example, a menu, a menu item, a sound clip, a video clip, and an image. The user interface elements 214, or representations thereof or corresponding thereto, are displayed on the user interface 104.

The memory area 208 further stores one or more computer-executable components. Exemplary components include a communications interface component 216, a detection component 218, a score component 220, and an interaction component 222. Operation of the computer-executable components is described below with reference to FIG. 3.

Figure 3:
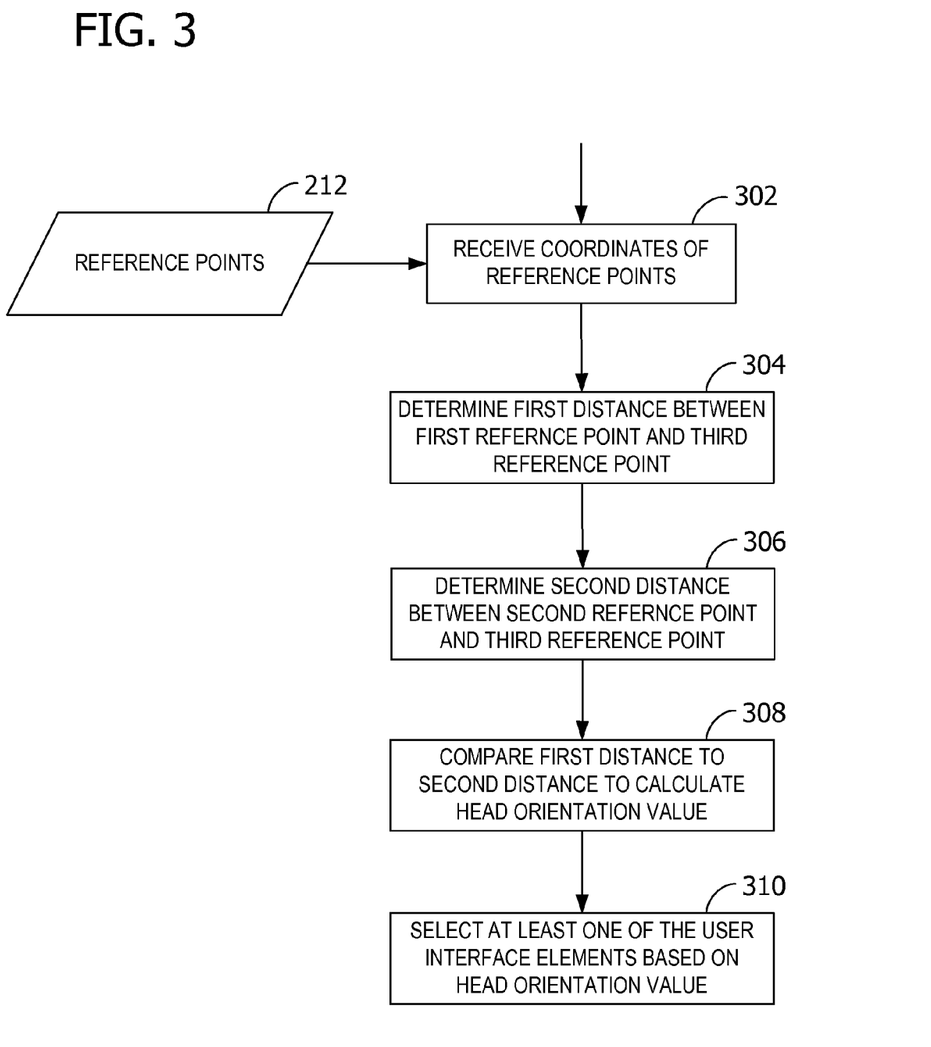
FIG. 3 is an exemplary flow chart illustrating operation of the head orientation module to compare distances between reference points to calculate a head orientation value.

Referring next to FIG. 3, an exemplary flow chart illustrates operation of the head orientation module 108 to compare distances between reference points to calculate a head orientation value. The computing device 202 implementing the head orientation module 108 receives or derives the coordinates representing a set 212 of at least three reference points of a subject gazing on a plurality of user interface elements 214 at 302. Exemplary coordinates may take the form of (X,Y). While some embodiments describe the subject as a human, aspects of the disclosure are operable with any subject (e.g., robot) viewing the user interface elements 214. The computing device 202 receives the set 212 of reference points from, for example, the capture device 106 or computing system associated with the capture device 106. In the example of FIG. 3, the set 212 of reference points includes at least a first reference point and a second reference point located on opposite sides of a third reference point.

In some embodiments, the computing device 202 receives coordinates for the first reference point and the second reference point, but not the third reference point. In the example of a face, the third reference point corresponds to the nose of the face. In such embodiments, the computing device 202 may instead receive a height of the subject and distance of the subject from the capture device 106. Based on this information, the computing device 202 computes the third reference point.

The received coordinates for the reference points may reflect calibration of the user 102 to the capture device 106 or head orientation module 108. An exemplary calibration process centers the subject's view by establishing center to be the subject looking straight ahead, top to be the subject looking up, and bottom to be the subject looking down.

At 304, the computing device 202 determines a first distance between the first reference point and the third reference point and determines a second distance between the second reference point and the third reference point at 306. In some embodiments, determining the distances comprises determining a difference between the first reference point and the third reference point along the horizontal axis and/or vertical axis. The difference along the horizontal axis determines whether the subject is gazing left or right. The difference along the vertical axis determines whether the subject is gazing up or down. Combinations of the above are also contemplated.

In some embodiments, the first distance along the horizontal axis is determined by the expression in Equation (1) below and the second distance along the horizontal axis is determined by the expression in Equation (2) below.

$$X_{THIRD\ REFERENCE\ POINT} - X_{FIRST\ REFERENCE\ POINT} = \text{FirstDistance} \quad (1)$$

$$X_{THIRD\ REFERENCE\ POINT} - X_{SECOND\ REFERENCE\ POINT} = \text{SecondDistance} \quad (2)$$

In embodiments in which the first reference point, second reference point, and third reference point correspond to a left eye, right eye, and a nose, the first distance and the second distance are determined by Equations (3) and (4) below, respectively.

$$X_{NOSE} - X_{LEFTEYE} = \text{FirstDistance} \quad (3)$$

$$X_{NOSE} - X_{RIGHTEYE} = \text{SecondDistance} \quad (4)$$

Figure 7:
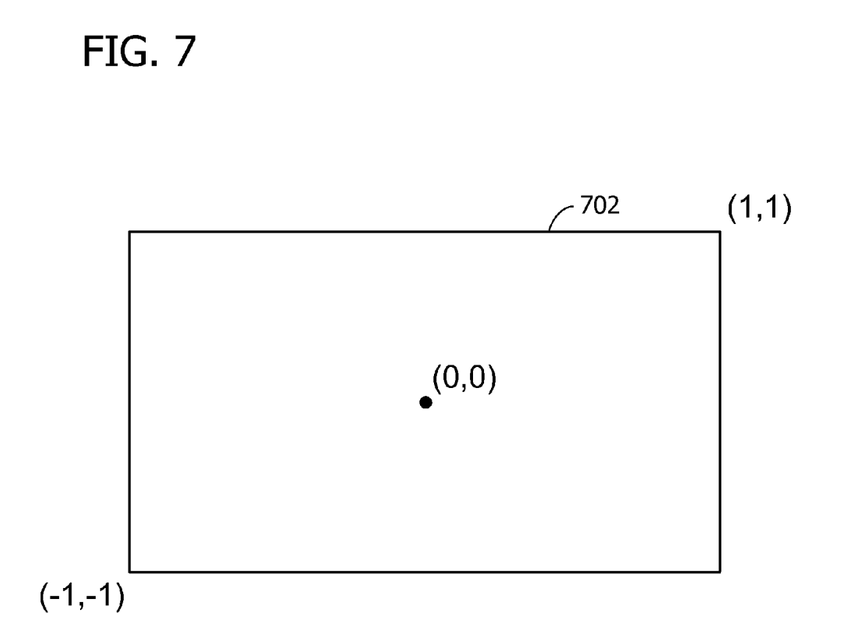
FIG. 7 is an exemplary user interface illustrating a coordinate system.

In an example, if the first reference point has coordinates (−0.5, 0.1) and the third reference point has coordinates (0, −0.1) using the exemplary coordinate system shown in FIG. 7, the first distance is determined to be "0−(−0.5)=0.5" along the horizontal axis. If the second reference point has coordinates (0.8, 0.2), the second distance is determined to be "0−0.8=(−0.8)" along the horizontal axis.

At 308, the computing device 202 compares the determined first distance to the determined second distance to calculate a head orientation value for the subject. Calculation of the head orientation value may be performed in various ways. In some embodiments, the first distance and the second distance are added or subtracted. In other embodiments, the computing device 202 produces a weighted combination of the first distance and the second distance. In such embodiments, the first reference point or the second reference point may be weighted more heavily based on, for example, the height of the subject, the distance of the subject from the capture device 106, or the features of the subject to which the reference points correspond (e.g., eyes, ears, mouth, etc.). The head orientation value may also represent a combination (e.g., average, mean, or median, weighed or otherwise) of head orientation values calculated for a plurality of captured images.

In some embodiments, the head orientation value is calculated using Equation (5) below.

$$\text{FirstDistance} + \text{SecondDistance} = \text{HeadOrientationValue} \quad (5)$$

Continuing the above example for the first reference point and the second reference point, the computing device 202 calculates the head orientation value along the horizontal axis as "0.5+(−0.8)=(−0.3)". The subject is thus determined to be gazing to the right of center on the user interface 104 if using a coordinate of (0, 0) for the center of the user interface 104, if the camera is facing the subject, and if the camera is not flipping the captured images about a vertical axis. Alternatively, some capture devices 106 operable with the disclosure may flip the captured images about a vertical axis. In such alternative embodiments, the subject is determined to be gazing to the right side of the user interface 104 if the calculated head orientation value is positive and to the left side of the user interface 104 if the calculated head orientation value is negative.

Alternatively or in addition, the computing device 202 calculates the head orientation values along the vertical axis. In this example, the head orientation value may be determined as shown in Equation (6) below.

$$Y_{NOSE} - ((Y_{LEFTEYE} + Y_{RIGHTEYE})/2) \quad (6)$$

In Equation (6), the vertical axis coordinates of the eyes are averaged and compared to the vertical axis coordinate of the nose. The subject is determined to be gazing towards an upper portion of the user interface 104 if the calculated head orientation value is positive and gazing towards a lower portion of the user interface 104 if the calculated head orientation value is negative.

At 310, the computing device 202 selects at least one of the user interface elements 214 displayed in the user interface 104 based on the calculated head orientation value. The head orientation value is mapped or overlaid on the user interface 104 to identify at least one of the user interface elements 214 displayed in the user interface 104. For example, the coordinate system used to define the reference points is applied to the user interface 104 to enable correlation of the head orientation value to at least one of the user interface elements 214. In the above example, the head orientation value of (−0.3) is mapped to a point or area on a menu, icon, text, avatar, or other displayed user interface element 214. In some embodiments, the mapped point is indicated by a circle with the border being a progress indicator at the focal point. When the progress indicator completes a revolution around the circle without a change of the focal point, action is taken on the user interface element 214 of the focal point.

In some embodiments, the location of the circle or ball on the user interface may be determined using Equation (7) and Equation (8) below.

$$\text{ballPoint·}X = \text{centerPoint·}X + \text{XmoltFactor}^* (\text{direction·Value·}X - \text{originalCalibratedDirection·}X) \quad (7)$$

$$\text{ballPoint·}Y = \text{centerPoint·}Y + \text{YmoltFactor}^* (\text{direction·Value·}Y - \text{originalCalibratedDirection·}Y) \quad (8)$$

In the above equations, the ballpoint variable represents the circle to draw, the centerPoint variable represents the coordinates of the center of the user interface, the XmoltFactor and YmoltFactor variables represent the factors along the x and y axis, respectively, to speed or slow the movement of the circle or ball, and the originalCalibratedDirection variable represents the calibrated coordinate values.

The selected user interface element 214 is distinguished from the other non-selected user interface elements 214. For example, the selected user interface element 214 may be highlighted, enlarged, outlined, animated, or otherwise altered (e.g., undergo a color change). Further, selecting the user interface element 214 may also activate the selected user interface element 214 or otherwise cause performance of an action associated with the selected user interface element 214. For example, the computing device 202 may execute one of the applications 210 corresponding to, or represented by, the selected user interface element 214.

In some embodiments, the computer-executable components illustrated in FIG. 2 execute to implement the operations illustrated in FIG. 3. For example, the communications interface component 216, when executed by the processor 204, causes the processor 204 to receive coordinates representing a first set 212 of at least three reference points from a first video frame of a subject gazing on a plurality of user interface elements 214. The set 212 includes a first reference point and a second reference point located on opposite sides of a third reference point. In some embodiments, the communications interface component 216 includes a network interface card and/or computer-executable instructions (e.g., a driver) for operating the network interface card.

The detection component 218, when executed by the processor 204, causes the processor 204 to determine a first distance between the first reference point and the third reference point and to determine a second distance between the second reference point and the third reference point. The score component 220, when executed by the processor 204, causes the processor 204 to compare the first distance determined by the detection component 218 to the second distance determined by the detection component 218 to calculate a first head orientation value for the subject.

The detection component 218 and the score component 220 subsequently operate on a second set 212 of at least three reference points from a second video frame to calculate a second head orientation value for the subject. The interaction component 222, when executed by the processor 204, causes the processor 204 to select at least one of the plurality of user interface elements 214 based on a comparison between the first head orientation value calculated by the score component 220 to the second head orientation value calculated by the score component 220. For example, if the user interface elements 214 represent a menu, the interaction component 222 selects one of the user interface elements 214 to navigate the menu.

In some embodiments, the communications interface receives additional input such as a pre-defined gesture or voice command from the subject. In such embodiments, the interaction component 222 selects the user interface element 214 based on the comparison and the received, pre-defined gesture. For example, the pre-defined gesture may include an arm movement, an eye-blink, or other pre-defined gesture to confirm a selection of one of the user interface elements 214 highlighted based on a current focus of the subject.

In another example, the score component 220 may detect a pause from the subject while focused on a particular user interface element 214. The pause may be detected by calculating and comparing the head orientation values for multiple video frames of the subject. For example, the computing device 202 may receive a plurality of streamed video frames of the subject viewing the user interface 104. If the difference among the head orientation values across a time period (e.g., a defined quantity or subset of video frames) satisfies a threshold value, the score component 220 detects a pause. The threshold value may correspond to, for example, a margin of error for movement of the subject (e.g., determined from a calibration of the subject with the computing device 202 or set by the user 102 or computing device 202). For example, if the difference among the head orientation values exceeds the threshold value, the score component 220 concludes that a pause has occurred.

If the score component 220 detects a pause, an action associated with the user interface element 214 selected by the interaction component 222 is performed. For example, one of the applications 210 associated with the selected user interface element 214 is executed.

Figure 4:
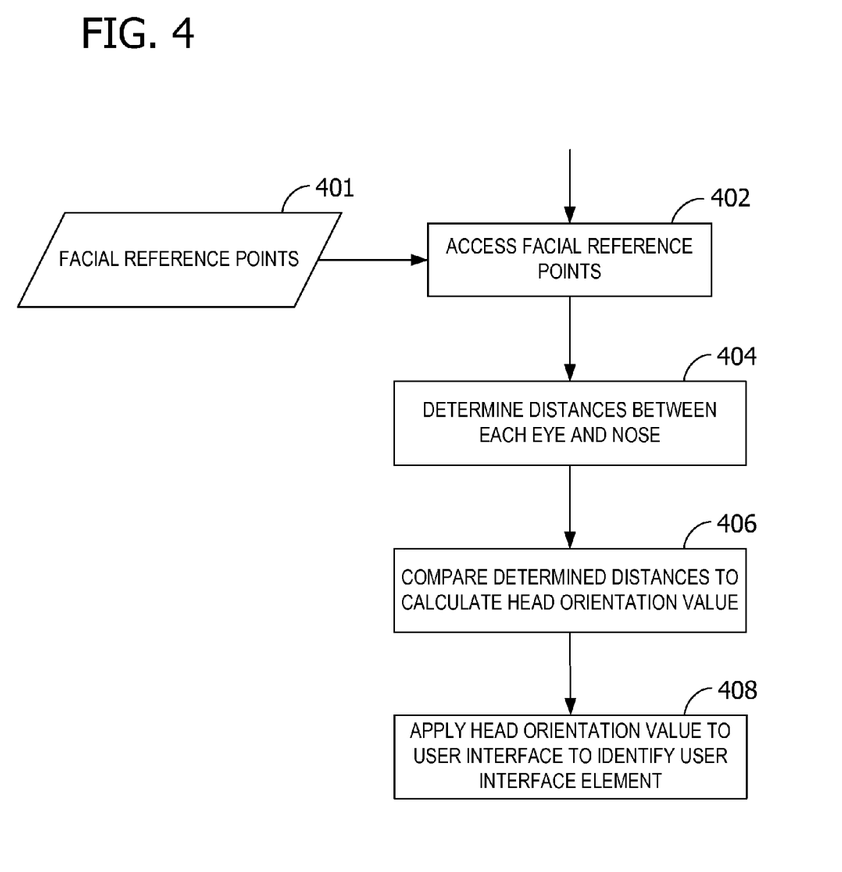
FIG. 4 is an exemplary flow chart illustrating operation of the head orientation module to apply a head orientation value calculated using two eyes and a nose to a user interface to identify a user interface element.

Referring next to FIG. 4, an exemplary flow chart illustrates operation of the head orientation module 108 to apply the head orientation value calculated using two eyes and a nose to the user interface 104 to identify one of the displayed user interface elements 214. The head orientation module 108 accesses a set of facial reference points 401 at 402. The head orientation module 108 determines a first distance between a first one of the eyes and the nose and determines a second distance between a second one of the eyes and the nose at 404. The determined first distance is compared to the determined second distance to calculate the head orientation value at 406. The head orientation module 108 applies the calculated head orientation value to the user interface 104 at 408 to identify at least one of the user interface elements 214 displayed by the user interface 104.

The head orientation module 108 may further distinguish the identified user interface element 214 on the user interface 104 among the one or more user interface elements 214 as described herein, and additionally perform an action associated with the identified user interface element 214.

Figure 5:
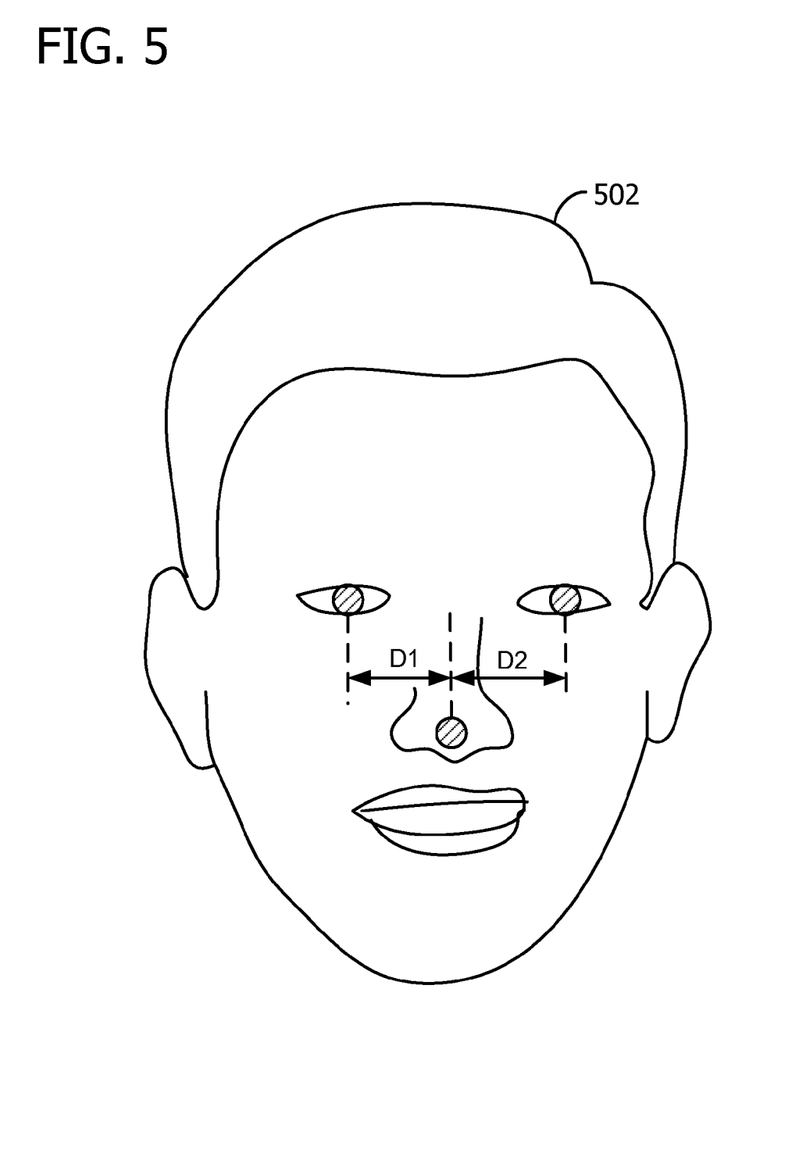
FIG. 5 is an exemplary face illustrating distances between the eyes and the nose.

Referring next to FIG. 5, an exemplary face 502 illustrates distances between the eyes and the nose. The face 502 in FIG. 5 represents, for example, the user 102 viewing the user interface 104. The capture device 106 may be a gaming console or a user computing device such as a laptop with a webcam. In some embodiments, the face 502 has been isolated from a larger image captured by the capture device 106 (e.g., the face 502 has been selected for analysis from a plurality of faces in the larger image). The image processing may be performed by the head orientation module 108 or a component separate from, yet capable of communication with, the head orientation module 108.

For example, the capture device 106 may capture an image of several users 102 in a room. Software and/or hardware image processing recognizes the users 102 by creating skeleton representations of the users 102. One of the skeleton representations is selected for tracking. For example, one of the users 102 may raise a hand during a calibration process and that user 102 may be designated as the user 102 to track.

After eliminating the non-designated users 102 from the captured image, the face 502 of the designated user 102 may be isolated, cropped, and analyzed to identify the set 212 of reference points. In this example, the set 212 of reference points includes two eyes and a nose as shown in FIG. 5. Coordinates for the two eyes and nose are provided to the head orientation module 108 for processing. Alternatively, the head orientation module 108 may identify the set 212 of reference points.

The head orientation module 108 computes the first distance and the second distance as described with reference to FIG. 3 and FIG. 4. In the example of FIG. 5, the first distance and the second distance are shown as D1 and D2, respectively. The distances D1 and D2 are measured along a horizontal axis across the face. In other embodiments (not shown), the distances D1 and D2 may be measured "line of sight" between each eye and the nose.

Figure 6:
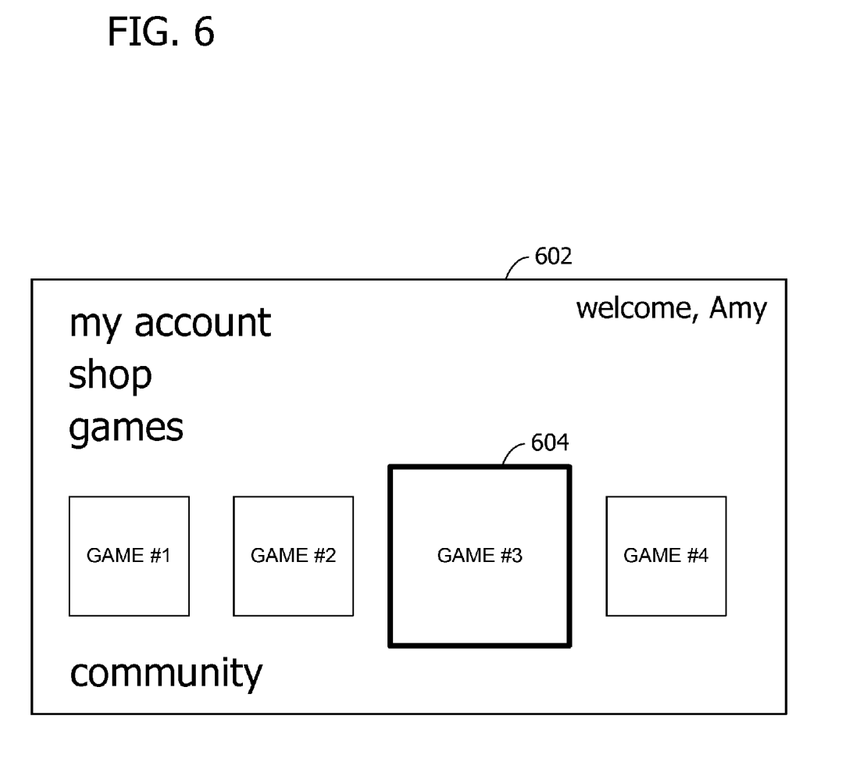
FIG. 6 is an exemplary screenshot of a user interface for a gaming console illustrating selection of a user interface element based on the calculated head orientation of the user.

Referring next to FIG. 6, an exemplary screenshot of a user interface 602 for a gaming console illustrates selection of at least one of the user interface elements based on the calculated head orientation value of the user 102. The user interface 602 shown in FIG. 6 illustrates several menu options (e.g., user interface elements) including "my account," "shop,"

"games," and "community." The "games" menu option includes several game options for selection by the user 102. In the example of FIG. 6, the user 102 is gazing at user interface element 604 which corresponds to Game #3.

The perceived focus of the user 102 as calculated from the head orientation value has remained fixed on user interface element 604 long enough such that the computing device 202 has enlarged and highlighted user interface element 604. If the user 102 pauses longer, or provides an additional gesture (e.g., head nod, eye blink, raised hand, etc.), the computing device 202 will execute Game #3 corresponding to user interface element 604.

Referring next to FIG. 7, an exemplary user interface 702 illustrates a coordinate system for use with embodiments of the disclosure. In the example of FIG. 7, the center point of the user interface 702 has coordinates (0, 0). The bottom left corner has coordinates (−1, −1) while the upper right corner has coordinates (1, 1). The coordinate system illustrated in FIG. 7 may be applied to the reference points in the images captured by the capture device 106 and may be applied to the head orientation value calculated by the head orientation module 108. In other embodiments, such as those in which the capture device 106 flips the image about a vertical axis, the positive and negative values shown in FIG. 7 invert (e.g., the bottom corner is (−1, −1) while the upper corner is (1, 1)). In such an embodiment, the user 102 is watching to the right with a head orientation value of 7.31 and watching to the left with a head orientation value of −6.11.

Additional Examples

Aspects of the disclosure increase the playability of games by allowing, for example, the user 102 to control a character in a game by peeking around a corner, selecting a car or weapon, and/or navigating terrain.

In an example, the user 102 glances through article titles and article summaries in a digital newspaper. As the user 102 pauses on a particular title, the computing device 202 increases the font of the article summary to make it easier for the user 102 to read while decreasing the font of the other article summaries or titles. After the user 102 glances at another article title or summary, the font of the previously-enlarge article returns to its previous size.

Some embodiments of the disclosure compensate for head tilt based on coordinates of the angle of tilt. After determining the angle of tilt, the coordinates of the eyes, nose, or other reference points are adjusted based on the determined angle of tilt to enable an accurate calculation of the head orientation value.

At least a portion of the functionality of the various elements in FIG. 1 and FIG. 2 may be performed by other elements in FIG. 1 or FIG. 2, or an entity (e.g., processor, web service, server, application program, computing device, etc.) not shown in FIG. 1 or FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 102. In such embodiments, notice is provided to the users 102 of the collection of the data (e.g., via a dialog box or preference setting) and users 102 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for distinguishing among the plurality of user interface elements 214 based on relative positions of the eyes and nose, and exemplary means for determining a head orientation to navigate a menu on the user interface 104.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for distinguishing among a plurality of user interface elements based on head orientation, said system comprising:
   a memory area associated with a computing device, said memory area storing a set of facial reference points including coordinates for at least two eyes of a subject, said memory area further storing a plurality of user interface elements for display on a user interface; and
   a processor programmed to:
      receive a height of the subject and a distance of the subject from a camera associated with the computing device;
      calculate a reference point for a nose of the subject based on the height and the distance of the subject from the camera;
      access the set of facial reference points stored in the memory area;
      determine a first distance between a first one of the eyes and the nose;
      determine a second distance between a second one of the eyes and the nose;
      compare the determined first distance to the determined second distance to calculate a head orientation value, the first distance and the second distance being weighted to calculate the head orientation value; and
      apply the calculated head orientation value to the user interface to identify at least one of the plurality of user interface elements displayed by the user interface.

2. The system of claim 1, wherein the processor is further programmed to distinguish the identified user interface element on the user interface among the plurality of user interface elements.

3. The system of claim 2, wherein distinguishing the identified user interface element comprises one or more of the following: highlighting the identified user interface element, enlarging the identified user interface element, outlining the identified user interface element, changing the color of the identified user interface element, and animating the identified user interface element.

4. The system of claim 1, wherein the processor is further programmed to perform an action associated with the identified user interface element.

5. The system of claim 1, wherein the memory area and the processor are associated with a gaming console.

6. The system of claim 1, further comprising a capture device for providing the set of facial reference points for storage in the memory area.

7. The system of claim 1, further comprising means for distinguishing among the plurality of user interface elements based on relative positions of the eyes and the nose.

8. The system of claim 1, further comprising means for determining a head orientation to navigate a menu on the user interface.

9. A method comprising:
   receiving, by a computing device, coordinates representing a set of at least three reference points in an image of a subject gazing on a plurality of user interface elements, the set including a first reference point and a second reference point located on opposite sides of a third reference point, wherein the subject is viewed by a camera, and wherein receiving the coordinates comprises receiving a height of the subject and a distance of the subject from the camera; more of the following: a height of the subject and a distance from the computing device of the subject;
   calculating the third reference point based on the height and the distance;
   determining a first distance between the first reference point and the third reference point;
   determining a second distance between the second reference point and the third reference point;
   comparing, by the computing device, the determined first distance to the determined second distance to calculate a head orientation value for the subject, the first distance and the second distance being weighted to calculate the head orientation value; and
   selecting, by the computing device, at least one of the plurality of user interface elements based on the calculated head orientation value.

10. The method of claim 9, wherein the first reference point or the second reference point is weighted more based on at least one of the height of the subject and the distance of the subject.

11. The method of claim 9, wherein receiving the coordinates comprises receiving two-dimensional coordinates for each of the reference points.

12. The method of claim 11, wherein the first distance and the second distance are determined along a horizontal axis of the received two-dimensional coordinates and wherein selecting the at least one of the plurality of user interface elements comprises selecting at least one of the plurality of user interface elements on a right side of a user interface if the calculated head orientation value is positive and selecting at least one of the plurality of user interface elements on a left side of the user interface if the calculated head orientation value is negative.

13. The method of claim 9, further comprising
   calibrating the coordinates to the subject.

14. The method of claim 9, wherein the image includes multiple faces, and further comprising selecting one of the faces for analysis.

15. The method of claim 11, wherein the first distance and the second distance are determined along a vertical axis of the received two-dimensional coordinates and wherein selecting the at least one of the plurality of user interface elements comprises selecting at least one of the plurality of user interface elements on an upper portion of a user interface if the calculated head orientation value is positive and selecting at least one of the plurality of user interface elements on a lower portion of the user interface if the calculated head orientation value is negative.

16. The method of claim 9, further comprising receiving, by the computing device, a plurality of streamed video frames of the subject gazing on the plurality of user interface elements, and wherein said receiving, said determining the first distance, said determining the second distance, and said comparing are performed by the computing device for a subset of the received video frames to calculate the head orientation value.

17. One or more computer storage media embodying computer-executable components, said components comprising:
- a communications interface component that when executed causes at least one processor to receive coordinates representing a first set of at least three reference points from a first video frame of a subject gazing on a plurality of user interface elements, the set including a first reference point and a second reference point located on opposite sides of a third reference point, wherein the subject is viewed by a capture device, and wherein receiving the coordinates comprises receiving a height of the subject and a distance of the subject from the capture device, wherein the third reference point is calculated based on the height and the distance of the subject;
- a detection component that when executed causes at least one processor to determine a first distance between the first reference point and the third reference point and to determine a second distance between the second reference point and the third reference point; and
- a score component that when executed causes at least one processor to compare the first distance determined by the detection component to the second distance determined by the detection component to calculate a first head orientation value for the subject, the first distance and the second distance being weighted to calculate the head orientation value,
- wherein the detection component and the score component operate on a second set of at least three reference points from a second video frame to calculate a second head orientation value for the subject; and
- an interaction component that when executed causes at least one processor to select at least one of the plurality of user interface elements based on a comparison between the first head orientation value calculated by the score component to the second head orientation value calculated by the score component.

18. The computer storage media of claim 17, wherein the score component further detects a pause between video frames based on a comparison between the first head orientation value and the second head orientation value, and further comprising performing an action associated with the user interface element selected by the interaction component.

19. The computer storage media of claim 17, wherein the communications interface component further receives a pre-defined gesture or voice command from the subject, and wherein the interaction component selects the at least one of the plurality of user interface elements based on the comparison and the received, pre-defined gesture.

20. The computer storage media of claim 17, wherein the user interface elements represent a menu, and wherein the interaction component selects the at least one of the plurality of user interface elements to navigate the menu.

* * * * *